United States Patent [19]
Wheeler

[11] Patent Number: 4,820,325
[45] Date of Patent: Apr. 11, 1989

[54] TREATMENT OF TOXICANT-IMPREGNATED FILTER CAKE

[75] Inventor: Donald R. Wheeler, Nashville, Tenn.

[73] Assignee: Stauffer Chemical Company, Shelton, Conn.

[21] Appl. No.: 111,828

[22] Filed: Oct. 22, 1987

[51] Int. Cl.$^4$ ............................. C03B 5/00; C03C 3/04
[52] U.S. Cl. ........................................ 65/27; 422/900; 501/27; 501/36; 501/155
[58] Field of Search .............................. 65/17, 27, 134; 501/126, 140, 155, 27, 36; 422/900

[56] References Cited

U.S. PATENT DOCUMENTS

| | | | |
|---|---|---|---|
| 3,007,882 | 11/1961 | Lach et al. | 501/155 |
| 4,020,004 | 4/1977 | Schulz et al. | 501/155 |
| 4,272,293 | 6/1981 | Hooykaas | 501/155 |
| 4,678,493 | 6/1987 | Roberts et al. | 65/134 |

FOREIGN PATENT DOCUMENTS 49-115986  11/1974  Japan ...................................... 501/31

OTHER PUBLICATIONS

Chemical Abstracts, vol. 87, 90346r, 1977.
Chemical Abstracts, vol. 88, 141266v, 1978.
Chemical Abstracts, vol. 99, 10383k, 1983.
Chemical Abstracts, vol. 99, 90363s, 1983.
Chemical Abstracts, vol. 104, 36659b, 1986.
Chemical Abstracts, vol. 91, 180844p, 1979.

*Primary Examiner*—Robert L. Lindsay
*Attorney, Agent, or Firm*—Paul J. Juettner

[57] ABSTRACT

A filter cake formed of a glass precursor material and impregnated with a normally leachable toxicant can be heated, preferably with at least one other glass precursor material, at a sufficiently high temperature to form a molten composition which solidifies, upon cooling, to form a glass. The normally leachable toxicant becomes fixed within the glass rendering it substantially more non-leachable allowing for a more environmentally sound means for disposal, e.g., by landfill techniques. The process can be used to treat the arsenic sulfide-impregnated filter cake derived from the manufacture of food grade phosphoric acid.

7 Claims, No Drawings

TREATMENT OF TOXICANT-IMPREGNATED FILTER CAKE

BACKGROUND OF THE PRESENT INVENTION

1. Field of the Present Invention

The present invention relates to the treatment of a filter cake impregnated with chemical toxicants to fix or seal the toxicants therein.

2. Description of the Prior Art

A variety of chemical processes utilize filter cake materials, such as diatomaceous earth, to filter unwanted materials, e.g., toxicants, from liquid chemical streams. When the filtration operation has been completed, the solid residue of the filtration comprises the filter cake impregnated with the materials removed from the filtrate. When leachable toxicants are contained in the filter cake, the disposal of the impregnated filter cake (e.g., in a landfill) can give rise to environmental problems due to leaching of the toxicants therefrom.

SUMMARY OF THE PRESENT INVENTION

The present invention relates to a procedure for effectively fixing normally leachable toxicants within a filter cake material formed of a glass precursor material. It involves the heating of such a filter cake, containing the normally leachable toxicant, preferably with at least one other glass precursor material, thereby forming a molten material containing the toxicant. The molten material solidifies to form a glass and traps or fixes the toxicant therein making it substantially less leachable therefrom. As used herein, the term "glass precursor" is used to denote one or more of those materials which, when heated to a sufficiently high temperature, preferably with at least one other "glass precursor" material, will yield a molten composition which, upon cooling, forms a glass composition.

DETAILED DESCRIPTION OF THE PRESENT INVENTION

The present invention is broadly applicable to fixing or trapping normally leachable toxicants within a particular class of filter cake media (i.e., a filter cake formed of a glass precursor material, such as a siliceous material like diatomaceous earth). It finds particular utility in the removal of arsenic sulfide, by filtration, from phosphoric acid, intended for food grade use, made by the thermal process.

In accordance with the present invention, the filter cake formed of a glass precursor material, like diatomaceous earth, is preferably admixed with one or more compatible glass precursor materials (e.g., such materials which, when heated with a source of silica, form glass) in order to form a molten composition which cools to form a glass thereby trapping the toxicant. Examples of compatible glass precursor materials for preferable use with a siliceous filter cake include soda ash, lime and alumina. It is included within the contemplation of the present invention that the filter cake could comprise a glass precursor material which, if heated in the absence of any other material, will still form a molten composition which, upon cooling, forms a glass composition. The relative amount or amounts of the glass precursor material or materials can be varied widely, as can be the temperature of heating, in accordance with glass making practice, as long as the resulting molten composition is one which, when cooled, solidifies to a glassy material thereby trapping or fixing the normally leachable toxicant therein to render it substantially more non-leachable. If desired, the mixture which is heated can contain additives which assist the process of ultimately trapping the toxicant in the final glass material which is formed. For example, it has been found advantageous to utilize sodium nitrate in quantities of about 1% when arsenic sulfide is the toxicant in the filter cake to oxidize the sulfide to the less volatile +5 oxidation state ($As_2S_5$).

The following Examples further illustrate the present Process.

EXAMPLE 1

Water-washed, oven-dried, arsenic sulfide-impregnated diatomaceous earth filter cake (73 grams) was blended with soda ash (24 grams), hydrated lime (13 grams), anhydrous alumina (2 grams), and sodium nitrate (1 gram). Sufficient water was then added to dampen the mixture and control potential dusting. The moist mixture was then thoroughly mixed. A portion of the resulting mixture was placed in a crucible and inserted into a melting furnace. The furnace temperature was then raised to 1450°–1500° C. and held at that temperature for 10 minutes. The molten contents in the crucible were then poured onto a stainless steel surface and allowed to solidify into a glassy composition. The glass had a transparent pale green color.

The solid glass was then broken as required for certain analytic tests: the Toxicity Characteristic Leaching Procedure (TCLP) and the EP Toxicity Test. The TCLP test is described in the Federal Register, Nov. 7, 1986, at pages 40643–40654. The EP Toxicity Test is EPA Method 1310, 40 CFR 261.24 No detectable arsenic was found in the leachate from either the TCLP or EP tests.

EXAMPLE 2

Diatomaceous earth filter aid (S35 grams), arsenic sulfide (2 grams), monosodium phosphate (6.0 grams), sodium carbonate (9.5 grams), hydrated lime (6.5 grams), anhydrous alumina (3 grams), sodium nitrate (1 gram), and activated carbon (0.5 grams) were admixed. After addition of enough water to dampen the mixture for dust control, the resulting mixture was thoroughly mixed. The resulting mixture was then placed in a crucible and heated as described in Example 1. The resulting glassy compositi n was opaque and black in color. No detectable arsenic was found in the leachate by the TCLP test.

The foregoing Examples illustrate certain embodiments of the claimed invention, but should not be construed in a limiting sense. The scope of protection which is sought is set forth in the claims which follow.

I claim:

1. A process for the fixation of a normally leachable toxicant within a filter cake formed of a glass precursor material, thereby rendering the toxicant substantially more non-leachable therefrom, which comprises forming a filter cake of siliceous glass precursor material having toxicant material entrapped therein, heating the filter cake containing the toxicant to fusion temperature to form a molten composition, and cooling said molten composition to form a glass containing the toxicant.

2. A process as claimed in claim 1 wherein the siliceous material forming the filter cake is diatomaceous earth.

3. A process as claimed in claim 1 wherein the toxicant is an arsenic sulfide.

4. A process as claimed in claim 3 wherein the siliceous material forming the filter cake is diatomaceous earth.

5. A process as claimed in claim 3 wherein the filter cake and toxicant are derived from the filtration of phosphoric acid containing said arsenic sulfide.

6. A process as claimed in claim 1 wherein the filter cake is mixed with at least one other glass precursor material prior to heating.

7. A process as claimed in claim 5 wherein the filter cake is mixed with at least one other glass precursor material prior to heating.

* * * * *